Jan. 8, 1952 W. S. PRAEG 2,581,701
METHOD OF FINISHING GEARS
Filed Feb. 7, 1949

INVENTOR.
WALTER S. PRAEG
BY Whittemore,
Hulbert & Belknap
ATTORNEYS

Patented Jan. 8, 1952

2,581,701

UNITED STATES PATENT OFFICE 2,581,701

METHOD OF FINISHING GEARS

Walter S. Praeg, Detroit, Mich., assignor to National Broach and Machine Company, Detroit, Mich., a corporation of Michigan Application February 7, 1949, Serial No. 74,882

2 Claims. (Cl. 90—1.6)

The present invention relates to a method of finishing gears and a cutter for carrying out the method.

It is an object of the present invention to provide a new method and cutter for finishing shaving gear teeth having different operating pressure angles at opposite sides of the teeth thereof.

Other objects and features of the invention will become apparent as the description proceeds, especially when taken in conjunction with the accompanying drawings, wherein.

Figure 1:
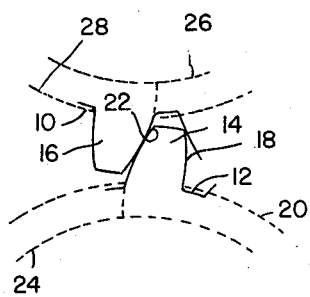
Figure 1 is a diagrammatic view illustrating the meshing relationship between a pair of gears, each of which has teeth provided with different operating pressure angles at different sides thereof.

Referring first to Figure 1 there is diagrammatically illustrated a pair of gears 10 and 12 having conjugate teeth 14 and 16, each of the teeth having different pressure angles at opposite sides thereof. Thus for example, the tooth 14 has one profile 18 which is an involute from a base circle 20, and an opposite side 22 which is an involute from a base circle 24 of smaller diameter than the base circle 20.

The mating gear 10 has a tooth 16, one flank of which is an involute from a relatively smaller base circle 26 and the opposite flank is an involute from the larger base circle 28. In use, the flanks of the teeth of the same pressure angle operate together.

The resulting set of gears having unsymmetrical teeth which are stronger than symmetrical teeth would be. The gears are intended for operation under load when the driving-driven flanks are those of lower pressure angle. The high pressure angle at the opposite sides results in a very strong tooth. The gears may of course be reversed but are intended for predominantly one-way drive.

In order to finish the surface of the teeth of gears 10 and 12, a shaving cutter 30 is employed which is designed to operate at crossed axes with the roughed out gear, preferably with the axes crossed between 3° and 30°. The cutter may have its tooth surfaces serrated to provide cutting edges extending up and down the teeth, or it may have the ends of the teeth formed to provide cutting edges. In the latter case, the sides of the teeth may be relieved as in a gear shaper cutter or the cutter may be tipped in use to introduced clearance in back of the cutting edges.

In the case of the cutter having serrated teeth, the cutter and gear are rotated in mesh, one of the parts being mounted for free rotation and directly driven by the other part. Simultaneously with the rotation of the parts in mesh, a relative reciprocation between the parts in a plane parallel to the axes of both the gear and cutter is effected. This reciprocation may be parallel to the axis of the gear or diagonally related thereto.

Figure 2:
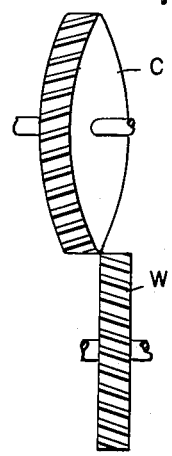
Figure 2 is a diagrammatic view illustrating the meshing relationship between a gear and cutter for shaving gear teeth.
Figure 3:
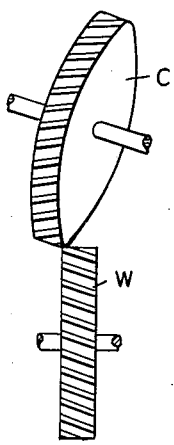
Figure 3 is a diagrammatic view of the meshing relationship between a gear and cutter for shaving gear teeth employing a slightly different mode of operation.

In the case of the cutter having cutting edges at the ends of its teeth, the gear and cutter are accurately geared together for simultaneously timed relation. The parts are rotated at relatively high speed and are relatively translated in the direction of the axis of the gear. If the cutter is provided with cutting clearance in back of the cutting edges of its teeth, the cutter may assume the position of the cutter C in Figure 2. If however, the teeth of the cutter are uniform from end to end so that they are not provided with natural clearance in back of the cutting edges, the cutter may be tipped or inclined as illustrated in Figure 3 so as thus to provide the necessary cutting clearance in back of the cutting edges.

In cases where the teeth of the cutter are provided with cutting edges at the ends thereof, the shaving operation is completed in a single stroke of traverse, following which the cutter and gear are separated radially and may be returned by a rapid stroke to the initial or starting position. In the event that the cutter is of serrated type traverse may involve one or more complete reciprocations.

It will be appreciated that in either of the operations just described, the gear shaving cutter is effective to produce a pressure angle on the sides of the gear teeth with which it contacts, which are respectively equivalent to the pressure angles formed on the cutter teeth. The difference in pressure angle at opposite sides of the gear teeth will thus be equivalent to the difference in pressure angle at opposite sides of the cutter teeth. This difference in pressure angle may relatively great as for example, a difference of 10° or more.

The drawings and the foregoing specification constitute a description of the improved method of finishing gears and gear finishing cutter in such full, clear, concise and exact terms as to enable any person skilled in the art to practice the invention, the scope of which is indicated by the appended claims.

What I claim as my invention is:

1. A method of finishing gears so as to provide gear teeth having different pressure angles at opposite sides thereof which comprises providing a gear-like finishing cutter, the corresponding sides of all of the teeth of said cutter having a first uniform pressure angle, the opposite sides of said teeth having a uniform pressure angle different from said first pressure angle, said cutter teeth being of uniform cross-section from end to end and having cutting edges at the ends thereof, meshing the gear and cutter with their axes crossed so as to provide a longitudinal relative sliding motion between the tooth surfaces of the gear and cutter as the parts are rotated together, providing a relative inclination between the gear and cutter to introduce clearance along the sides of the cutter teeth in back of the cutting edges thereof, rotating the gear and cutter independently in accurately timed relationship in mesh at relatively high speed and effecting a relative traverse at feeding speeds between the gear and tool in a direction to distribute the finishing action of the cutting edges of the cutter teeth from end to end of the gear teeth.

2. The method of shaving gears which comprises meshing a gear-like cutter member having teeth of uniform cross-section from end to end and provided with cutting edges formed by the intersection of the side and end surfaces with a gear member to be shaved with the axes of said members crossed in space in tight mesh in a relationship equivalent to locating said gear member in a horizontal plane, and inclining the axis of said cutter member such that its projection in a horizontal plane forms an angle of between 3 degrees and 30 degrees with the axis of said gear member, relatively locating said members in such crossed axes relationship such that the ends of the cutter teeth in mesh with the gear are closely adjacent the common normal to the gear axis and the projection of the cutter axis, and are at the ends of the teeth of the gear member with the gear teeth and cutter teeth at opposite sides of the said common normal, providing cutting clearance by additionally inclining the cutter to position the ends of its teeth provided with cutting edges closer to the axis of the gear than the opposite ends of its teeth, driving both of said members in accurately timed relation at cutting speeds, and effecting relative traverse at feeding speeds between said members in the direction of the axis of the gear member to distribute the cutting action from end to end of the gear teeth.

WALTER S. PRAEG.

REFERENCES CITED

The following references are of record in the file of this patent:

UNITED STATES PATENTS

| Number | Name | Date |
| --- | --- | --- |
| 2,270,422 | Drummond | Jan. 20, 1942 |
| 2,282,193 | Lambrix | May 5, 1942 |
| 2,295,148 | Witham | Sept. 8, 1942 |
| 2,499,167 | Sanborn | Feb. 28, 1950 |